| United States Patent [19] | [11] Patent Number: 4,922,246 |
|---|---|
| Cormen et al. | [45] Date of Patent: May 1, 1990 |

[54] MESSAGE MERGING DEVICE

[75] Inventors: Thomas H. Cormen, Cambridge; Charles E. Leiserson, Winchester, both of Mass.

[73] Assignee: Massachusetts Institute of Technology, Cambridge, Mass.

[21] Appl. No.: 934,830

[22] Filed: Nov. 25, 1986

[51] Int. Cl.$^5$ .......................... H04Q 1/00; H04Q 3/04
[52] U.S. Cl. .................. 340/825.90; 307/465; 328/103; 340/825.79
[58] Field of Search ......... 340/825.02, 825.74–825.93, 340/825.03; 307/243, 463, 465, 241, 449, 468; 328/103, 104, 152; 84/1.01, 1.03, DIG. 19, DIG. 2, DIG. 23, DIG. 8; 379/273, 272, 292, 268, 333, 335

[56] References Cited

U.S. PATENT DOCUMENTS

| 3,636,231 | 1/1972 | Schrecongost et al. | 84/DIG. 8 |
|---|---|---|---|
| 3,637,915 | 1/1972 | Hirano | 84/DIG. 23 |
| 4,112,260 | 9/1978 | Kurokawa et al. | 379/333 X |
| 4,570,154 | 2/1986 | Kinghorn et al. | 340/365 S |

*Primary Examiner*—Ulysses Weldon
*Attorney, Agent, or Firm*—Robert F. O'Connell

[57] ABSTRACT

A technique for controlling the routing of valid messages, such as digital data in bit-serial form, for example, wherein such messages are supplied to a selected number of input terminals and circuitry is provided to make such valid messages available at selected ones of a plurality of output terminals which preferably are concentrated as adjacent ones of the output terminals. An overall concentrator system can use successive stages of devices having n+m input and n+m output terminals each device employing a plurality of gates which include one or more pulldown circuits, each pulldown circuit having no more than a fixed number of transistors in series, which number is independent of n and m. Such devices can be implemented by nMOS or domino CMOS integrated circuits so that the transistors are formed in a regular pattern of relatively high density at reasonable cost.

14 Claims, 5 Drawing Sheets

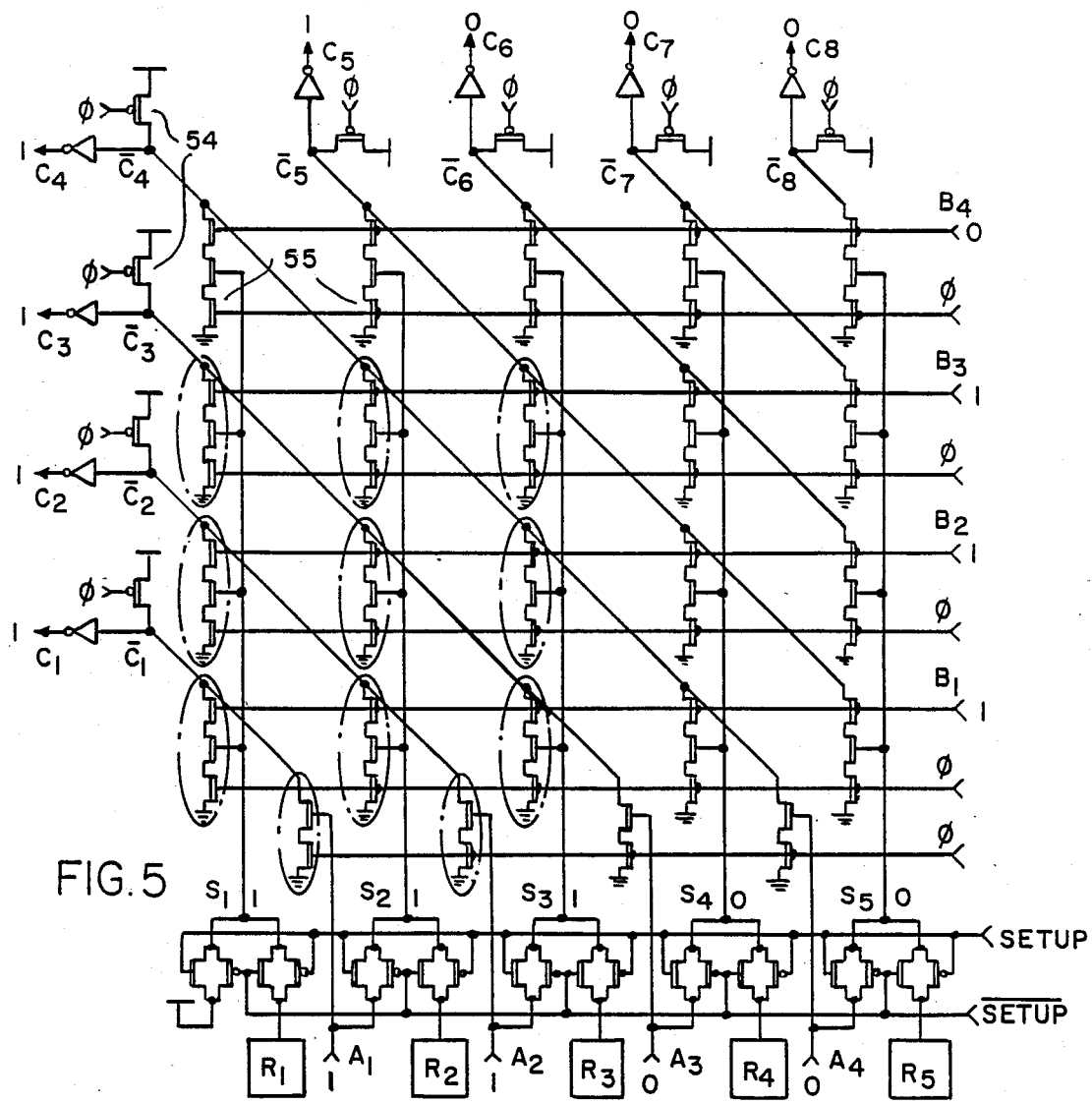
FIG.5
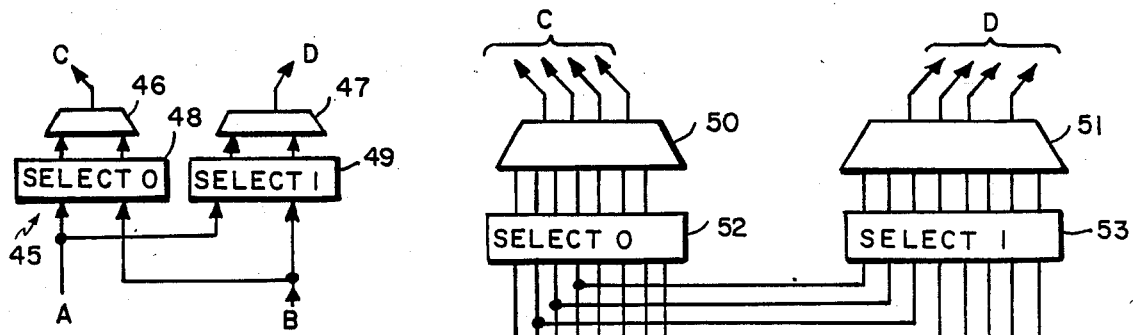
FIG.6
FIG.7

MESSAGE MERGING DEVICE

The Government has rights in this invention pursuant to Grant Number N00014-80-C-0622 awarded by the Department of the Navy.

This invention relates generally to message routing techniques and, more particularly, to hyperconcentrator switching techniques for preferably performing such routing for digital data in the form of bit-serial messages.

BACKGROUND OF THE INVENTION

It is often necessary to route messages which are generated from a plurality of different sources through output paths which are fewer in number than the number of possible input messages. In other words, the number of input messages must be concentrated in some manner so that a selected number thereof are available at selected routing paths at any one time. If the number of input messages is greater than the number of outputs available for them, certain messages will simply not be able to be handled by the system. The messages which then are not available may be buffered (i.e., held in storage) in some manner so that they can be readily accessed so as to be available at a later time, or they may be re-routed in some other manner through paths in other systems, or they may be fed back to their source with a command that they be re-sent at a later time.

Whatever technique may be used to handle messages that are not transmitted, it is necessary to utilize a suitable technique for concentrating the larger number of messages down to the fewer number of outputs in a manner which is effective in performance and which can be achieved at reasonable cost.

The general problem of handling multiple inputs where fewer outputs are available is discussed in the publication "Graph-Theoretic Properties In Computational Complexity", L. G. Valiant, JCSS, Vol. 13 No. 3, Dec. 1976, pp. 278–285. Such publication generally describes the problem in a graphical sense and broadly discusses what is required but does not disclose any specific implementation technique for resolving the problem in any particular manner.

The publication "Ultracomputers", J. T. Schwartz, ACM Transactions on Programming Languages and Systems, Vol. 2 No. 4, Oct. 1980, pp. 484–521, discusses a similar problem for compacting data information for parallel computations. The technique suggested by Schwartz for routing fewer than the total number of multiple messages which are supplied utilizes relatively complex control circuitry for implementing an algorithm which controls switching in a manner so as to produce the desired concentration of messages. Such algorithm is complex and would be relatively expensive to implement, the size of the system required for such implementation also being larger than is desirable for many applications. Moreover, the overall speed of operation thereof may not be acceptable in many applications.

It is desirable, therefore, to provide a way of concentrating multiple messages to a lesser number thereof in a manner which is both reasonably effective in cost and in speed of performance as well as in the physical size of the system required therefor. Such a technique would be extremely useful when dealing with parallel operating computers so as to handle the outputs of a relatively large number of such computers for routing such outputs in an appropriate concentrating manner. If the speed of operation of the message concentration system is comparable to that of the speed of operation of the computers which are being so serviced, such a concentrator switch technique would be of great assistance in dealing with such parallel processor network operations.

BRIEF SUMMARY OF THE INVENTION

In accordance with the invention a message handling system has a plurality of input terminals each capable of receiving an input message, and a plurality of output terminals each capable of providing an output message. As used herein the term message is used in a relatively broad sense to include any signal which contains information. One such message, for example, may be a bit-serial digital data signal such as would be used in digital data processing or digital computer systems.

A concentrator is termed a "perfect concentrator" if it always routes as many input messages as possible therethrough. Thus, a concentrator is perfect if (1) when the number of input messages is equal to or less than the number of output terminals, a message path is established from each input terminal which contains a message to an output terminal; and (2) when the number of input messages is greater than the number of output terminals, each output terminal has a message path established from an input terminal which contains a message.

The message handling system of the invention can be arranged as a perfect concentrator and includes means responsive to a number of input messages which are received at a corresponding number of the input terminals thereof for directing the input messages to a plurality of adjacent output terminals, which output terminals are arranged in a specified order. Thus, when a number of input messages, which number is less than the total number of output terminals, are received at various ones of the input terminals, not necessarily adjacent each other, such messages are concentrated so as to be directed to the corresponding number of output terminals, the directions thereof being controlled so that the messages are made available at the first group of adjacent ones of the output terminals, e.g., when the output terminals are ordered as 1, 2, 3 ... X, the output messages are concentrated as adjacent members of a group Y thereof, where $Y \leq X$, on to a corresponding first group 1, 2, 3 ... Y of adjacent output terminals. Such a concentrator is often termed a "hyperconcentrator".

In accordance with the invention, a hyperconcentrator switching technique designed for routing messages comprises a plurality of basic switching units termed "merge boxes" or "merge units", each of which can be formed as a unique layout of gates which provides a regular and dense pattern of elements and which provides no more than a fixed number of gate delays independently of the size of the merge unit, i.e., the input/output message capacity of the unit. The merge units can be readily formed as nMOS or CMOS integrated circuit chips. The merge units can then be suitably combined to form a hyperconcentrator switch using recursive merging in a manner which permits the switch to be self-setting, as described below.

BRIEF DESCRIPTION OF THE INVENTION

The invention can be understood in more detail with the help of the accompanying drawings wherein FIG. 1 depicts in diagrammatic form a typical basic merge unit in accordance with the invention;

FIG. 5 depicts a circuit diagram of a merge unit in domino CMOS technology;

FIG. 6 depicts a block diagram of a conventional butterfly switch;

FIG. 7 depicts a block diagram of a generalized butterfly switch using the techniques of the invention;

Although the invention is not to be limited thereto, it is helpful in understanding the operation thereof to describe the basic merge unit of the invention in the context of routing bit-serial, digital data messages, each message being formed by a stream of bits which arrive at an input terminal of the device at a fixed clock cycle rate, e.g., one bit per clock cycle.

For a message to be valid it is conventional that the first bit thereof be designated as the "validity" bit so as to indicate whether the subsequent bits arriving at such terminal form a valid or an invalid message. Normally a valid state is indicated by a "1" in the first, or validity bit of the bit sequence while an invalid message would be designated by a "0" in such validity bit. A valid message is one which it is desired to route from an input terminal to an output terminal of the concentrator switch, while an invalid message is one which does not need to be routed to any output terminal. In the initial setup thereof, the merge unit is arranged so that the validity bits of all input messages arrive at the input terminals of the switch device during the same clock cycle, the timing of the operation thereof being appropriately arranged in a manner which would be well known to those in the art so that such initial setup of the incoming messages can be suitably performed. The information bits (i.e., message bits) of each input message, which bits subsequently follow the validity bit at each clock cycle thereafter, are then appropriately directed along selected signal paths in the switch device which have been established during the initial setup stage.

Figure 1:
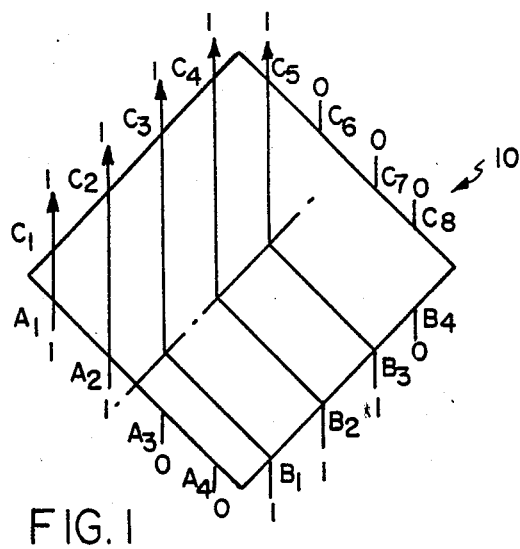

A typical merge unit 10 is shown diagrammatically in FIG. 1 so as to provide an understanding of the desired operation thereof. Such a device is termed a "merge unit" or "merge box" because, in effect, it merges the signals on various input terminals to a selected number of adjacent output terminals. Thus, as shown in FIG. 1, a plurality of (n+m) input terminals, designated as the input terminals $A_1-A_4$ (where n=4) and $B_1-B_4$ (where m=4) are capable of receiving messages for routing through the merge box. In the particular example shown, valid messages are received only at input terminals $A_1$, $A_2$, $B_1$, $B_2$, and $B_3$ (shown by the "1" thereat).

The merge box has a plurality of (n+m) output terminals designated as $C_1-C_8$. It is desired that the valid input messages be routed to the first set, or group, of adjacent output terminals, namely, terminals $C_1-C_5$, respectively (shown by the "1" thereat) for the example depicted.

Figure 2:
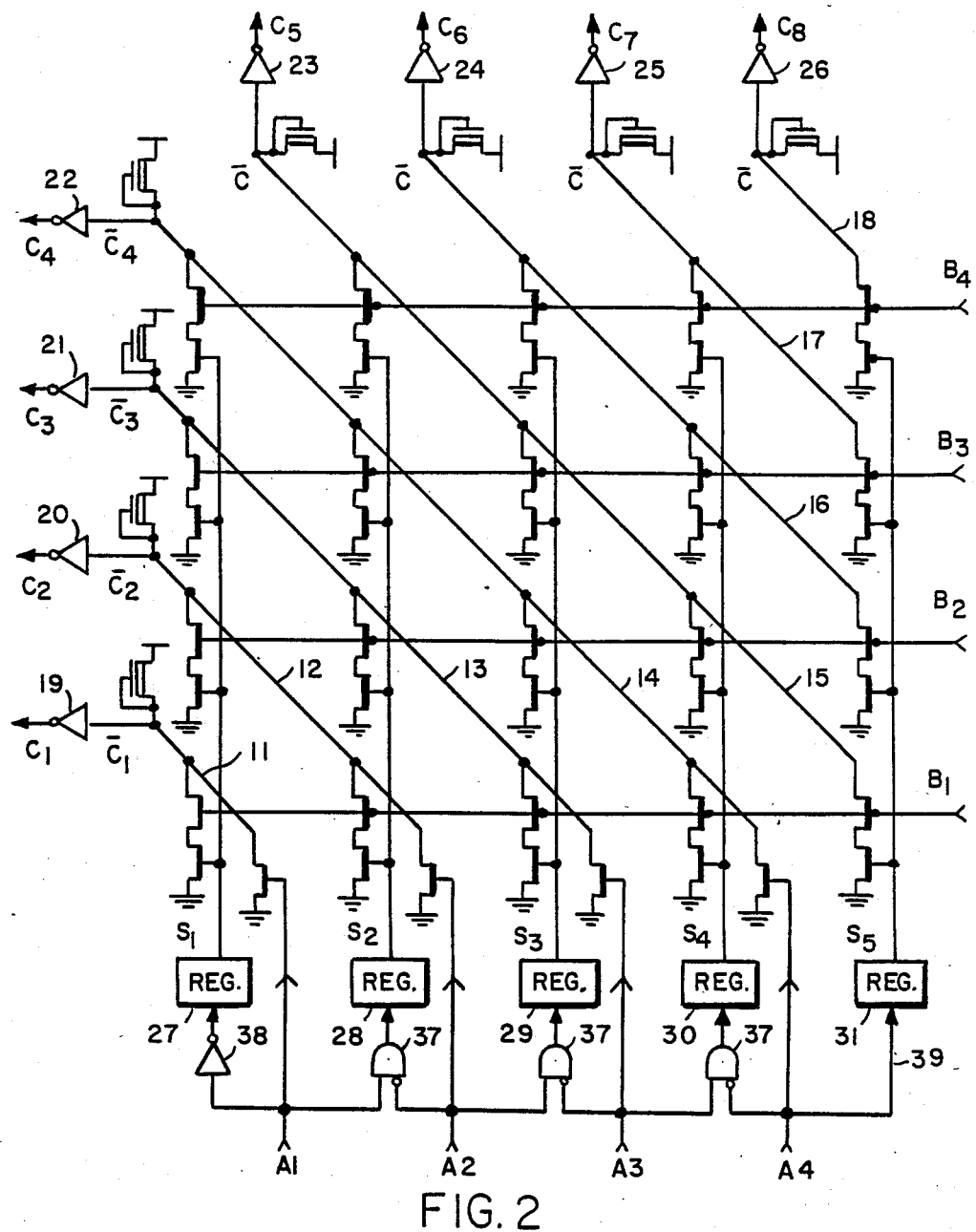
FIG. 2 depicts a circuit diagram of the merge unit of FIG. 1.

In order to achieve the desired operation a novel circuit diagram of a merge box 10 having two sets of four input terminals $A_1-A_4$ and $B_1-B_4$ and output terminals $C_1-C_8$ is more specifically depicted in FIG. 2. The typical merge box that is shown utilizes eight NOR gates which can be effectively represented by the diagonal lines 11-18 and the transistors associated therewith. The outputs of the NOR gates are labelled $\overline{C}_1-\overline{C}_8$, each output being inverted through inverters 19-26 to provide output terminals $C_1-C_8$. The operation thereof can be viewed so that the pulling down of any diagonal wire is equivalent to its corresponding output being a "1". The NOR gates have fan-ins ranging from just one pulldown circuit as, for example, in the gate associated with $C_8$ to five parallel pulldown circuits, e.g., the gate associated with $C_4$. In accordance with the invention each parallel pulldown circuit consists of no more than a fixed number of transistors which number is independent of the number of input terminals (e.g., in the particular embodiment shown there are no more than two transistors in each pulldown circuit). The number of transistors in each pulldown determines the length of the NOR gate delay time period, the time period increasing as the number of such transistors increases. The number of transistors depends on the integrated circuit technology which is used to form the circuitry. The number of delays, however, remains the same independent of the technology used, there being two time delays in such circuitry, one for NOR-gate operations and one for the inverter operation. The ratio of sizes of pullups to pulldowns can be adjusted to achieve a variety of time/area tradeoffs, but these adjustments affect essentially only the speed of individual gates and are essentially independent of the number of inputs.

The switch settings are designated as $S_1-S_5$, which settings are computed and stored in registers 27-31, respectively, during setup, based on the valid bits appearing at the input terminals, as discussed in more detail below. The stored settings in registers 27-31 continue to be used during the subsequent message clock cycles and establish the appropriate connections between the input and output terminals throughout the overall switch. Other than the initial storing of the switch settings in the registers 27-31 during setup, the operation of the overall merge box is purely combinational.

Such operation can be described in a typical example as discussed with reference to FIG. 3. With reference to the initial set-up operation, the circuitry of FIGS. 2 and 3 requires that the following initial conditions be met.

$A_1 \ldots A_p=1$; $0 \leq P \leq n$
$A_{p+1} \ldots A_n=0$
$B_1 \ldots B_q=1$; $0 \leq q \leq m$
$B_{q+1} \ldots B_m=0$ where A and B represent the bits on the input (n+m) terminals during set-up. That is, the first group of p bits at the A terminals (where p can be equal to any number from 0 to n) and the first group of q bits at the B terminals (where q can be equal to any number from 0 to m) must be 1's. Once the circuit has been so set up the connections between the p+q inputs are established to the p+q lower numbered outputs in a combinational fashion, i.e., $C_1=A_1$, $C_2=A_2 \ldots C_p=A_p$, $C_{p+1}=B_1$, $C_{p+2}=B_2\ldots C_{p+q}=B_q$. Accordingly, valid bits appear at the outputs as follows:

$C_1, C_2, \ldots C_{p+q}=1$
$C_{p+q+1} \ldots C_{n+m}=0$

Such connections are maintained during the subsequent message cycles for the remaining message bit streams which follow. As can be seen in the example of FIG. 3, the two lower numbered input terminals $A_1$, $A_2$ (p=2) and the three lower numbered input terminals $B_1$, $B_2$, $B_3$ (q=3) each have validity bit values of "1", while the higher numbered input terminals $A_3$, $A_4$ and $B_4$ have validity bit values of "0". A valid bit of 1 entering an A input terminal causes the single-transistor pulldown to pull the corresponding C wire down to 0, producing a 1 at the corresponding C output terminal. Thus, the input condition $A_i=1$ causes the output value of $C_i$ to be 1.

The switch settings $S_1$–$S_5$ act as steering or directional signals for directing the valid input messages at the B terminals to those output terminals adjacent the highest output terminal to which the valid input messages at the A terminals have been directed. Thus, for the example of FIG. 3, the two input terminals $A_1$ and $A_2$ have connections established with output terminals $C_1$ and $C_2$, respectively, while the input terminals $B_1$, $B_2$ and $B_3$ have connections established with output terminals $C_3$, $C_4$, and $C_5$, respectively.

In such case only $S_3$ is "1" and all other S values ($S_1$, $S_2$, $S_4$ and $S_5$) are "0". In such case there are five valid messages being transmitted through the merge box and five conducting paths to ground which are circled by dashed lines in FIG. 3 as ground paths 32–36, one for each of the five diagonal wires associated with $C_1$–$C_5$. The paths to ground designated in FIG. 3 cause output values of "1" on the corresponding output terminals $C_1$–$C_5$ as shown. The remaining diagonal wires associated with $C_6$–$C_8$ are not pulled down to ground by these input values and the output terminals $C_6$–$C_8$ all have the value "0".

In effect, the switch setting at which S is a "1" represents the point at which an associated output terminal and subsequent adjacent output terminals become switched from A input terminals to B input terminals. In the specific example shown in FIG. 3, where valid messages are at $A_1$ and $A_2$ and at $B_1$, $B_2$ and $B_3$, $S_3=1$ and output terminals $C_3$, $C_4$ and $C_5$ are switched for connection to input terminals $B_1$, $B_2$ and $B_3$ at which valid messages are present. The decision as to which switch settings are to be set at a "1" for such purpose can be determined by the 1 and 0 values at the A terminals, using simple AND logic as follows:

$$S_i = A_{i-1} \wedge \overline{A_i}$$

where i is the switch number under consideration. A well-known implementation of such logic statement is shown, for example, in FIG. 2 by logic gates 37. Thus, for the specific case of FIG. 3, such logic statement can only be true for $S_3 = A_2 \wedge \overline{A_3}$. Since at the end switches, i.e., at the first and last switches $S_1$ and $S_{n+1}$ (n=4 in the example shown), there is no associated input terminal $A_0$ and no associated input terminal $A_{n+1}$, the logic statements for setting such end point switches at a "1" value are as follows:

$$S_1 = \overline{A_1}$$

and $$S_{n+1} = A_n$$

Such logic statements are implemented in a well-known manner, for example, in FIG. 2 by the inverter 38 and the direct connection 39, respectively.

Figure 3:
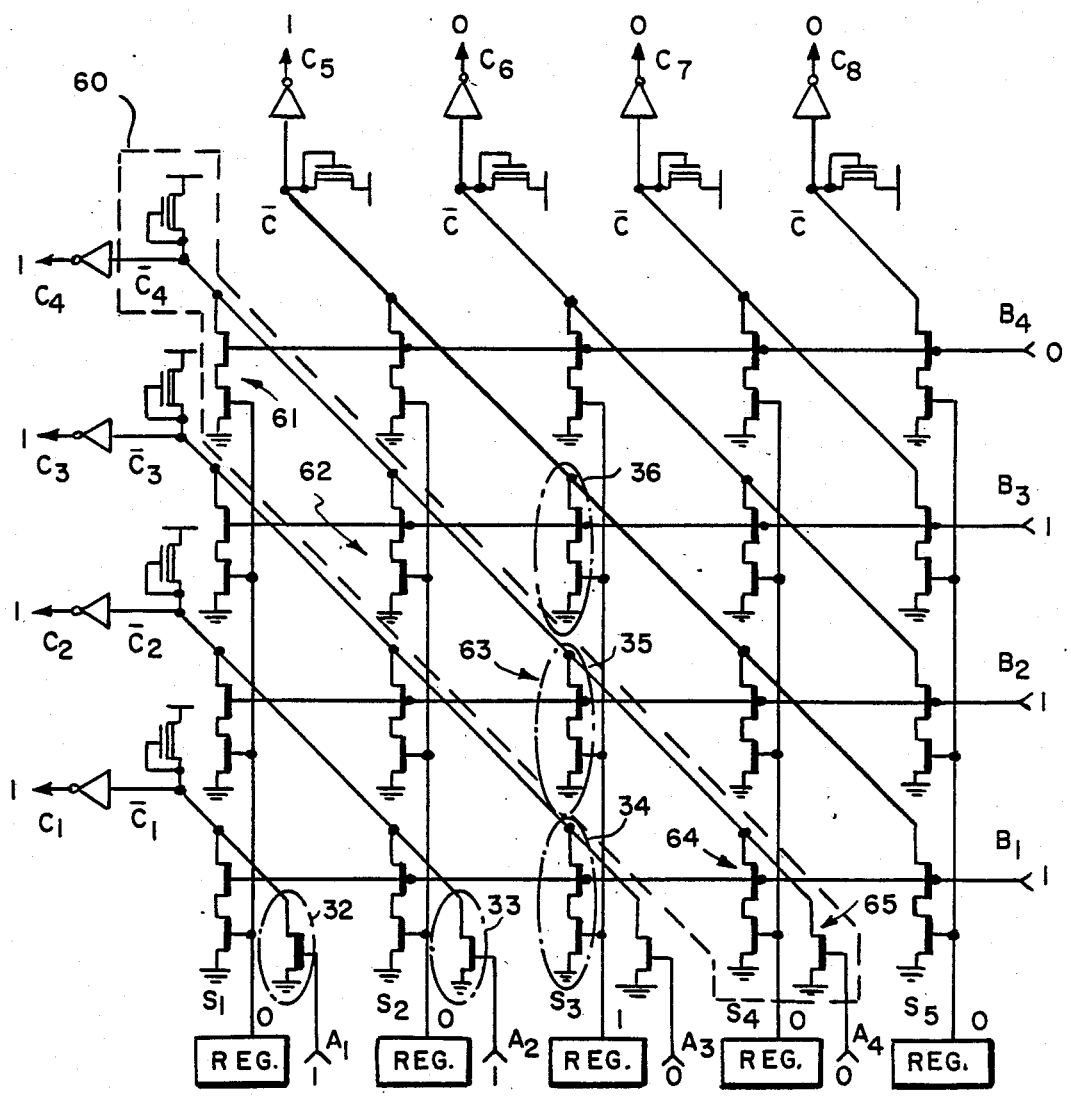
FIG. 3 depicts the merge unit of FIG. 2 in a manner which is helpful in understanding the operation thereof.

Thus, for the particular situation shown in FIG. 3, the subsequent information bits of all of the valid messages are appropriately routed to a first group of output terminals, i.e., all bits following the validity bits at input terminals $A_1$, $A_2$, $B_1$, $B_2$ and $B_3$ are supplied to output terminals $C_1$, $C_2$, $C_3$, $C_4$, and $C_5$, respectively. Because of the merge box configuration shown, it is necessary that, for all invalid messages (i.e., at input terminals $A_3$, $A_4$, and $B_4$), any subsequent bits be forced to "0" so that spurious operations of the transistors do not occur. Such operation can be assured by ANDing the validity bit (which is "0" for each such terminal) with each subsequent bit of the invalid message.

The general configuration of FIGS. 2 and 3 for an (n+m) input merge box (FIGS. 2 and 3 are symmetrical in configuration and n=m=4) and the principles of operation thereof are the same for merge boxes of other sizes and for non-symmetrical units in which n does not equal m. The configuration of FIGS. 2 and 3 uses gates which are known in the art as two disjunctive normal form gates and, in particular, each gate uses a selected number of pulldown circuits. For example, the gate shown by the dashed line 60 uses four two-transistor pulldown circuits 61, 62, 63, 64 and one single transistor pulldown circuit 65.

It is found that, using the unique merge unit configuration of the invention, each pulldown circuit of each gate therein never uses more than a fixed number of transistors in series, which number is independent of the values of n and m (i.e., independent of the size of the merge unit). In the configuration of FIGS. 2 and 3, for example, where n+m=8, the number of series transistors in each pulldown circuit for each gate thereof is never more than two, and that would be true for the same general configurations where (n+m) is equal to 2, 4, 8, 16 . . . etc. It is also found that the placement of the gates and the transistor elements thereof can be arranged in a substantially regular pattern and can be formed as a very large scale integrated (VLSI) circuit having a relatively high element density.

Because the number of series transistors in each pulldown circuit is no greater than a fixed number, the NOR gate delay time period required for operation is determined by such fixed number and is nearly independent of the merge unit size. Thus, for the configuration of FIGS. 2 and 3, the unit operates with the same NOR gate time delay (determined by the fact that the number of pulldown transistors is no more than two) for larger, or smaller, merge units of the same configuration. Accordingly, a hyperconcentrator switch which comprises several stages of merge units (as discussed below) requires the same overall time delay (NOR gate time delay plus inverter time delay) at each stage in contrast to other known approaches to the design of hyperconcentrator switches in which the overall time delays at each stage increases as the size of each stage increases.

An overall hyperconcentrator switch device for routing a relatively large number of messages can be formed using a plurality of merge boxes of various sizes. Such a switch is shown diagrammatically in FIG. 4 in which an overall hyperconcentrator switch device 40 utilizes merge units of varying sizes to produce a desired message flow in four stages for 16 possible messages in the particular example depicted.

Thus, eight two-input, two-output merge boxes 41 (n=m=1), each having one A input, one B input and two C outputs are used in the first stage, four merge boxes 42 each having two A, and two B inputs and four C outputs (n=m=2) being used in the second stage, two merge boxes 43 each having four A and four B inputs and eight C outputs (n=m=4, such as shown in FIG. 2) being used for the third stage, and a single merge box 44 having eight A and eight B inputs and sixteen C outputs (n=m=8) being used for the fourth stage. As shown in a particular example of the operation of FIG. 4, nine valid messages arrive at various input terminals of the first stage merge boxes 41 (shown by a "1" at such inputs) and all of the nine valid messages are concentrated so as to be routed to the first nine output terminals (also shown by a "1" at such outputs) from the final merge box 44. In each case the output wires of a particular merge box represent one-half of the input wires of a merge box in a subsequent stage. Thus the output terminals at adjacent merge boxes in the first stage are connected to the input terminals of a single merge box of the second stage, and so on through each of the four stages. A hyperconcentrator switch of the type depicted in FIG. 4 can generally be described as one which has input terminals $X_1, X_2, \ldots X_n$, of which k contain valid messages, and output terminals $Y_1, Y_2, \ldots Y_n$, and routes the k valid messages to the first k output terminals $Y_1, Y_2, \ldots Y_k$ thereof. The number of gate delays of such hyperconcentrator switch is $2\log_2 n$.

Figure 4:
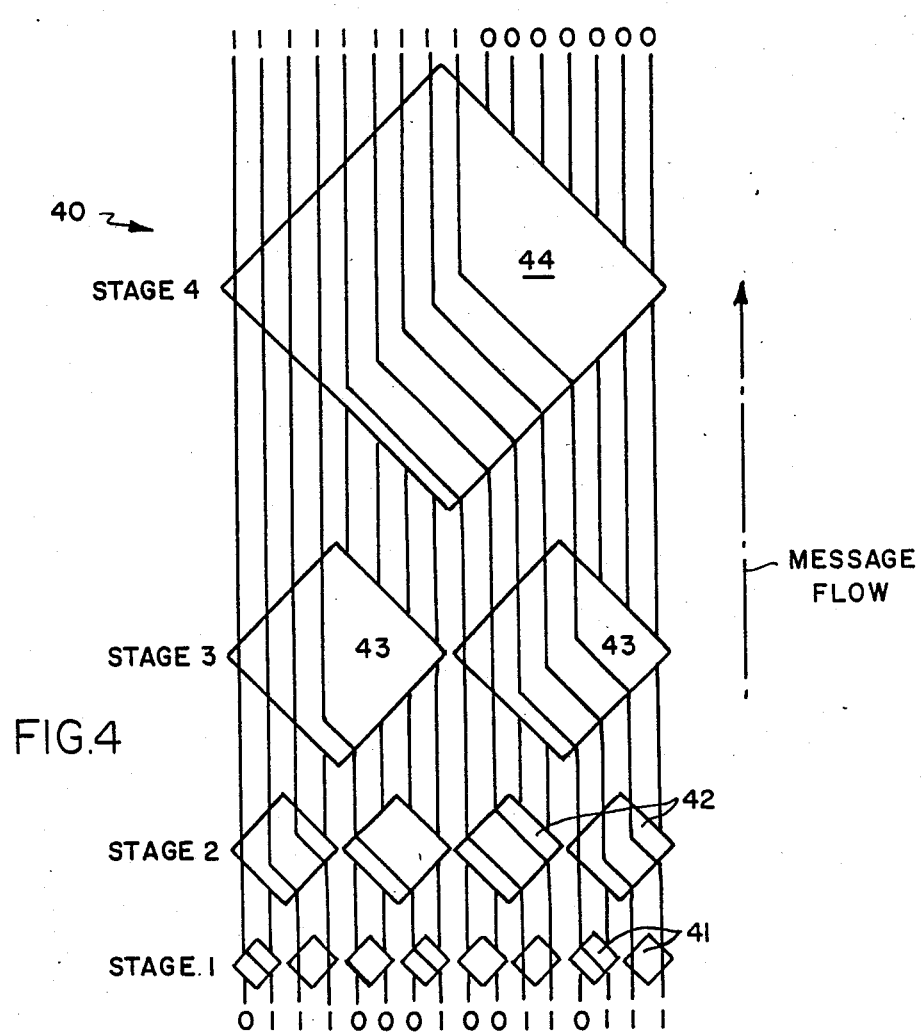
FIG. 4 depicts an overall hyperconcentrator switch using several stages of merge units of the general type shown in FIGS. 1-3.

A unique and interesting feature of a hyperconcentrator switch of FIG. 4 lies in the fact that the merge units used in the initial stage 1 of the system all have a basic two-input, two-output form wherein n=m=1, only one A terminal and one B terminal being used. Because of such fact, each such merge unit automatically satisfies the merge box initial conditions discussed above. That is, whether p=1 or p=0 and whether q=1 or q=0, such conditions are met and the initial set up of all merge units in stage 1 is automatic. As can be seen in FIG. 4, because the first stage is automatically set, the next stage 2 is also automatically set, the routing of the valid validity bits (1's) being automatically directed to the input terminals of stage 2 in a manner so as also to satisfy the initial conditions for such merge units (where n=m=2). Similarly for each of the succeeding stages such initial conditions are automatically satisfied so that all of the stages are initially set in an automatic manner in response to the validity bits received at stage 1. Accordingly, the hyperconcentrator switch of the invention can be described as one which is self-setting and which provides recursive merging of valid input messages. In the particular example shown, k=9 and nine valid messages (depicted as 1's at the input) are mapped to the first nine output terminals (also shown by 1's).

The circuit configurations for the merge units, such as the exemplary one shown in FIGS. 2 and 3 can readily be formed on appropriate semiconductor chips using well known techniques for preparing nMOS chips, for example. As mentioned above, such configuration results in highly regular layouts of reasonably high density for the circuitry involved, and the techniques for placing such circuitry in such highly regulated integrated circuit form would be well within the skill of the art.

While the above design is readily adapted for use in an nMOS design, the concept thereof is also useful in a chip with a precharged methodology such as a domino CMOS chip design. Such latter design requires some modification of the circuitry of FIGS. 2 and 3 such as shown in FIG. 5. Such design includes p-channel precharge transistors 54 and n-channel evaluate transistors 55 (all shown with inputs $\phi$). The major design change from nMOS to domino CMOS technology is in the values assigned to the S wires during setup. For example, if it is supposed that during setup valid bit values on the input wires are present in accordance with the same initial conditions discussed above with reference to FIG. 2, then during setup, instead of setting only $S_{p+1}$ to 1 (as in the nMOS design of FIGS. 2 and 3), the S wires are set as follows:

$S_1, S_2, \ldots S_{p+1} = 1$ $S_{p+2}, S_{p+3}, \ldots S_{n+1} = 0$

As before, the registers $R_1, R_2, \ldots R_5$ are loaded only during setup, so that only $R_{p+1}$ is 1, as in the nMOS version:

$R_1 = \overline{A_1}$ $R_i = A_{i-1} \wedge \overline{A_i}$ for $1 < i \leq n$ $R_{n+1} = A_n$ After setup, values are set such that $S_i = R_i$ for $1 \leq i \leq n+1$, so that the S wires then take on the values stored in the register during setup. Only $S_{p+1}$ is 1, again as in the nMOS design.

In the precharge phase $\overline{\phi}$ of setup, the diagonal wires $\overline{C}_1, \overline{C}_2, \ldots, \overline{C}_{n+m}$ are charged high, so the output wires $C_1, C_2, \ldots, C_{n+m}$ are all low. During the evaluate phase $\phi$ of setup, the wires $\overline{C}_1, \overline{C}_2, \ldots, \overline{C}_p$ are pulled down by $A_1, A_2, \ldots, A_p$, as in the nMOS design. Unlike the nMOS case, however, $S_1, S_2, \ldots, S_{p+1} = 1$ and $B_1, B_2, \ldots, B_q = 1$. If $q > 0$, then the wires $\overline{C}_1, \overline{C}_2, \ldots, \overline{C}_{p+q}$ (not just $\overline{C}_{p+1}, \overline{C}_{p+2}, \ldots, \overline{C}_{p+q}$) are pulled down by the S and B wires during the evaluate phase of setup. If instead q=0, then no $\overline{C}$ wires are pulled down by S and B wires. The result is that during the evaluate phase of setup, the output wires take on the values $C_1, C_2, \ldots, C_{p+q} = 1$ $C_{p+q+1}, C_{p+q+2}, \ldots, C_{n+m} = 0$ as desired. During evaluate phases after setup, the A, B, and S wires take on the same values as they do in the nMOS circuit, so the circuit again works as required.

As with the nMOS design, the number of transistors in series in each pulldown circuit is no greater than a fixed number independently of the size of the merge unit. In this case the number of transistors is no greater than 3 in any pulldown circuit.

An important advantage of hyperconcentrator switches made in accordance with the invention, as shown, for example, in FIG. 4, lies in that they can replace single wires by bundles of wires in bit serial routing networks. Where formerly simple switches connecting individual wires have been used, a hyperconcentrator switch to concentrate bundles of many wires into bundles having fewer wires can be made. Such routing network then is capable of routing messages with a higher probability of transmission. Moreover, routing networks which use hyperconcentrator switches in accordance with the invention are capable of making more routing decisions at each clock cycle, thereby using each clock cycle more efficiently.

Another example where such hyperconcentrator switches can be efficiently used is in butterfly switches (nodes) having multiple inputs and outputs. A typical simple two-input two-output butterfly switch 45 having a single A input and a single B input, a C output and a D output is shown in FIG. 6. A message typically has an address bit following its valid bit. A valid bit of 1 indicates that we wish to route the remaining bits of the message to an output terminal. The address bit indicates the output terminal (C or D) to which the message is to be directed. A single level of a routing network such as a butterfly would typically have several such nodes side-by-side. The node contains two simple 2-by-1 concentrator switches, depicted as trapezoids 46 and 47, one with outputs going left and one with outputs going right. Each simple concentrator switch is preceded by a selector circuit 48 and 49, respectively, that, given an input valid bit and an address bit, produces a new valid bit which is 1 if, and only if, the input valid bit is 1 and the address bit matches the output direction of the concentrator switch. If two valid messages with equal address bits enter such a butterfly node, only one is successfully routed.

A potential problem with such a scheme is that it may not use the available clock period efficiently. The simple node uses only a few levels of logic, so the delay through it is only a few nanoseconds. But because of the time required to get signals on and off chips in current technologies, one cannot necessarily distribute a clock with a frequency high enough to match the short delay of this node. In fact, the clock period that can be distributed is typically an order of magnitude greater than the delay through the node. The node therefore may perform no useful work in at least 90 percent of each clock cycle.

A more general n-input, n-output butterfly node is shown for n=8 in FIG. 7. It has a total of 8 input wires A and B and 8 output wires C and D, with 4 outputs going left and 4 outputs going right. But here two n-by-n/2 hyperconcentrator switches 50 and 51, one with outputs only going left and one with outputs only going right, are used together with selector circuits 52 and 53.

The advantage of the larger node is that at the same clock speed as the simple nodes, it can successfully route more valid messages in each clock cycle. The clock speed remains the same because the additional delay introduced by the larger concentrator switches occurs during the unused portion of the clock period. Hence, nodes such as FIG. 7 use a larger portion of the available clock period. Because the simple nodes discussed previously leave so much of the available clock period unused, hyperconcentrator switches in accordance with the invention can be scaled up considerably in size before the delay introduced exceeds the original clock period.

In order to see that more valid messages are routed by the larger node of FIG. 7, assume that a valid message arrives at each input wire of each switch and that the address bit is 0 with a probability of $\frac{1}{2}$, independent of the address bits of other messages. An appropriate calculation can be used to show that the simple nodes (FIG. 6) can be expected to successfully route $3n/4$ of the n arriving messages. A more complex calculation can show that the expected number of valid messages successfully routed by a larger node (FIG. 7) with n input wires is $n-O(n^{\frac{1}{2}})$. Intuitively, it can be seen that the larger nodes successfully route more valid messages because they have more freedom in mapping inputs to outputs.

Another application of hyperconcentrator switches in accordance with the invention is in building superconcentrator switches. An n-by-n superconcentrator switch has n input wires $X_1, X_2, \ldots, X_n$ and n output wires $Y_1, Y_2, \ldots, Y_n$. For any $1 \leq k \leq n$, disjoint electrical paths may be established from any set of k input wires to any arbitrarily chosen set of k output wires. Superconcentrator switches are useful in fault-tolerant systems, for example. If some of the output wires of a concentrator switch are faulty, a superconcentrator switch can be used to route signals only to the non-faulty output wires. Such a superconcentrator switch 56 having eight X-inputs 57 and eight Y-outputs 58 is shown in FIG. 8.

Figure 8:
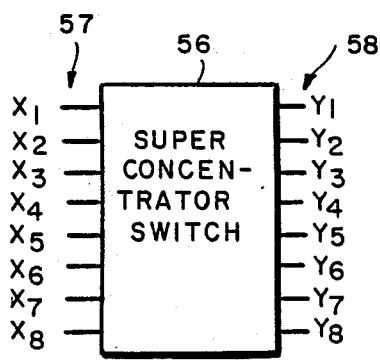
FIG. 8 depicts a block diagram of a superconcentrator switch having n input and n output terminals.

A superconcentrator switch 66 can be formed from two full-duplex hyperconcentrator switches 67 and 68 as shown in FIG. 8. After the initial setup, in a full-duplex hyperconcentrator switch, signals can travel along the established paths simultaneously in both forward and reverse directions. Extending the design of the hyperconcentrator switch to provide full-duplex operation is relatively straightforward. The output wires of the switch 67 (a "forward" hyperconcentrator switch) feed directly into the reverse input wires of the full-duplex hyperconcentrator switch 68 (a "reverse" hyperconcentrator switch). If there are y good output wires of the superconcentrator switch, before setup of the superconcentrator switch, the switch 68 sets up electrical paths from its first y reverse input wires $Z_1, Z_2, \ldots, Z_y$ to the y good reverse output wires. These paths are established by assigning a 1 to each forward input wire of the switch 68 that corresponds to a good output wire, assigning a 0 to the forward input wires corresponding to faulty output wires, and running a setup cycle of the switch 68, as discussed above.

Setup of the superconcentrator switch is then just the setup of the hyperconcentrator switch 67. The k valid messages are routed through the switch 67 to the wires $Z_1, Z_2, \ldots Z_k$ and then along the reverse paths through the switch 68 to the first k good output wires. Thus, in FIG. 8, if there are four non-faulty outputs ($Y_1, Y_3, Y_4$ and $Y_7$), where y=4, the reverse hyperconcentrator switch 68 is set up to provide connections to the first four inputs thereto ($Z_1, Z_2, Z_3$ and $Z_4$). The forward hyperconcentrator switch 67 is then set up for the number k of valid inputs (in the example shown, k=4) at $X_2$, $X_3$, $X_5$ and $X_8$ which are routed to the first four outputs thereof corresponding to the first four inputs $Z_1$-$Z_4$ of hyperconcentrator switch 68.

Figure 10:
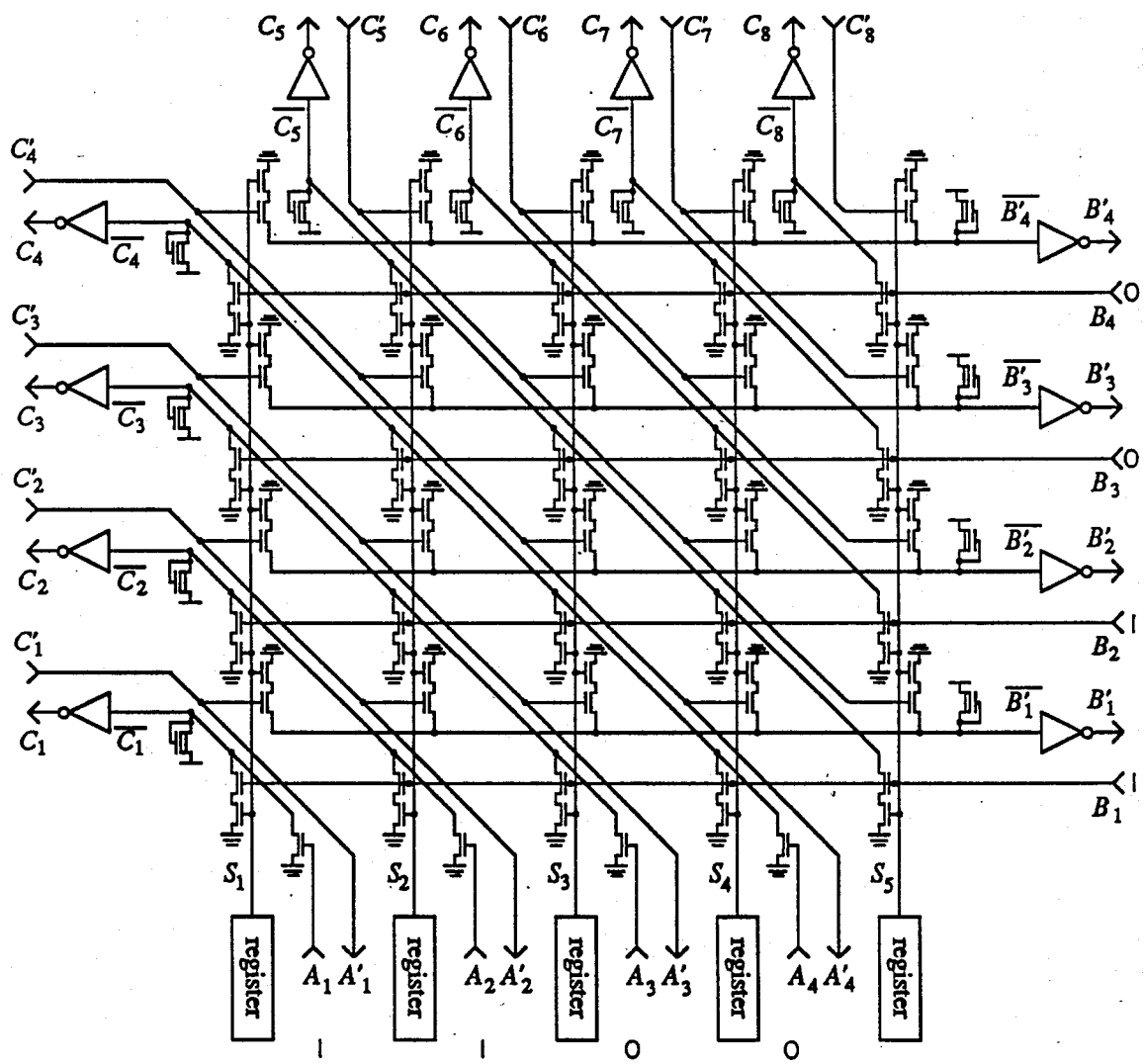
FIG. 10 depicts a specific circuit diagram of a switch device of the invention which can be used in the network of FIG. 9.
Figure 9:
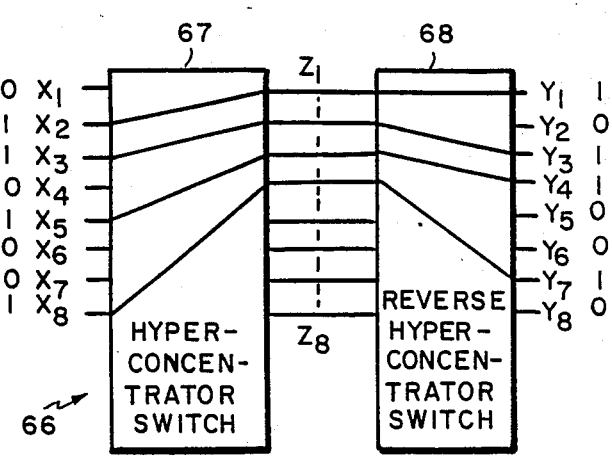
FIG. 9 depicts a block diagram wherein the switch of FIG. 8 is implemented using hyperconcentrator switches of the invention.

A typical merge unit which can be used to provide the bi-directional operation required for the hyperconcentrator switch 68 in FIG. 9 is shown in FIG. 10 in which the particular exemplary merge box is similar to that of FIGS. 2 and 3 (n=m=4) and has pairs of input terminals $A_1$-$A_4$, $A_1'$-$A_4'$ and $B_1$-$B_4$, $B_1'$-$B_4'$ as well as pairs of output terminals $C_1$-$C_8$ and $C_1'$-$C_8'$. When used for routing in the reverse or second direction (for use in hyperconcentrator switch 68 of FIG. 8, for example), $C_1'$-$C_8'$ act as input terminals and $A_1'$-$A_4'$ and $B_1'$-$B_4'$ act as output terminals. Routing is then dependent on the values of the A and B terminals as before. In the particular example shown in FIG. 10, when used in the initial set up, valid bits are at $A_1$ and $A_2$ and $B_1$ and $B_2$ as received from a preceding state of merge units and designated by "1"s and are routed to $C_1, C_2, C_3$ and $C_4$. When used in the reverse direction, messages at terminals $C_1'$-$C_4'$ are routed to $A_1', A_2', B_1'$ and $B_2'$, respectively, and then through the remaining stages of the reverse hyperconcentrator switch 68 in a reverse direction.

In any of the applications discussed above there is no guarantee that any specific message to be passed through a routing network which uses such concentrator switches will reach its destination. When a concentrator switch device is congested (i.e., there are more input messages than output terminals which can be used to handle them at any one time), some messages cannot be routed through the switch. One way to take care of such a situation is to have such routing networks include some form of acknowledgment mechanism whereby appropriate circuitry at the destination of the message can be used to inform the source of the message that the message has been received. If the sending source fails to obtain an acknowledgment before a selected fixed amount of time elapses, the source can then be arranged to re-send the message at a later time. Between operations the switches in the merge boxes of the routing network can be arranged to hold their settings so as to transmit acknowledgments in the reverse direction from the original messages. Thus the concentrator switches can be arranged to be fully duplex in nature after setup. Such duplex switching then allows messages to be transmitted through the switch in one direction and acknowledgement signals to subsequently pass through the switch in the reverse direction so long as the valid input terminals are retained in this valid state.

An alternative technique for handling such congestion is to buffer the messages which cannot be routed successfully, holding them in reserve at an input until that input can be routed successfully through the network. In a still further alternative technique, a message which cannot be successfully routed through the network can simply be misrouted.

While the above discussion discloses specific embodiments of the invention to demonstrate the configuration and operation thereof, modifications thereto may be made by those in the art within the spirit and scope of the invention and, hence, the invention is not to be deemed as limited to the particular embodiments disclosed, except as defined by the appended claims.

What is claimed is:

1. A message merging device for controlling the routing of messages comprising
    a first set of n input terminals and a second set of m input terminals, one group of said n input terminals receiving valid input messages and one group of said m input terminals receiving valid input messages, the remaining groups of said n and said m terminals not receiving valid input messages;
    a plurality of (n+m) output terminals;
    switching means for controlling the directing of valid messages from said n and said m input terminals to said (n+m) output terminals;
    switch control means which, when responsive to the messages received at said m and n input terminals, controls the setting of said switching means as a function only of the presence or absence of valid messages at said input terminals; and
    means responsive to the setting of said switching means for substantially simultaneously directing the valid input messages received at said n and said m input terminals to the first ones of said output terminals according to a predetermined sequence of said output terminals, said message directing means including
    a plurality of gates controllably enabled by the setting of said switching means, each gate comprising one or more pulldown circuit having no more than a fixed number of active elements in series, said number being independent of the values of n and m.

2. A message merging device in accordance with claim 1 wherein said switch control means, when responsive to messages received at said m and n terminals, provides a plurality of switch control input signals the state of each of said signals being a function only of the presence or absence of valid messages on a fixed number of said n input terminals, said fixed number of input terminals being independent of n.

3. A device in accordance with claim 1 wherein said one group of said n input terminals are adjacent terminals, said one group of said m input terminals are adjacent terminals, and said selected ones of said output terminals are adjacent terminals.

4. A device in accordance with claim 1 wherein said n input terminals are designated as input terminals $A_1$ through $A_n$ and valid input messages are received at input terminals $A_1$ through $A_p$, where p is less than n, and m input terminals are designated as input terminals $B_1$ through $B_m$ and valid input messages are received at input terminals $B_1$ through $B_q$, where q is less than m, and said output terminals are designated as output terminals $C_1$ through $C_{n+m}$ and said valid input messages are directed to output terminals $C_1$ through $C_{p+q}$.

5. A device in accordance with claim 1, 3, or 4, wherein said active elements are transistors and each of said gates requires a time delay to route said valid messages from said n and said m input terminals to said selected ones of said output terminals, said time delay being substantially determined by said fixed number of series transistors.

6. A device in accordance with claims 1, 3 or 4 wherein said messages are in the form of binary bits having values of 1 or 0 and further wherein the device operates so that, during an initial set-up mode, said device satisfies initial conditions such that initial input bits of valid messages at said one group of said n input terminals are each a 1 and initial input bits at the remaining group of said n input terminals are each a 0 and further such that initial input bits of valid messages at said one group of said m input terminals are each a 1 and initial input bits at the remaining group of said m input terminals are each a 0.

7. A device in accordance with claim 1 wherein n=m.

8. A device in accordance with claim 1 wherein n is not equal to m.

9. A device in accordance with claim 5 wherein said plurality of gates each comprises one or more transistors, said transistors being formed in an nMOS integrated circuit in a substantially regular pattern thereof.

10. A device in accordance with claim 9 wherein the number of transistors in series in each pulldown circuit is fixed.

11. A device in accordance with claim 10 wherein said fixed number is two.

12. A device in accordance with claim 5 wherein said plurality of gates each comprises one or more transistors, said transistors being formed in a domino-CMOS integrated circuit in a substantially regular pattern thereof.

13. A device in accordance with claim 12 wherein the number of transistors in series in each pulldown circuit is fixed.

14. A device in accordance with claim 13 wherein said fixed number is three.

* * * * *